(12) United States Patent
Ide

(10) Patent No.: US 12,481,156 B2
(45) Date of Patent: Nov. 25, 2025

(54) OPTICAL MODULE AND HEAD-MOUNTED DISPLAY DEVICE

(71) Applicant: SEIKO EPSON CORPORATION, Tokyo (JP)

(72) Inventor: Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 609 days.

(21) Appl. No.: 17/708,510

(22) Filed: Mar. 30, 2022

(65) Prior Publication Data

US 2022/0317452 A1 Oct. 6, 2022

(30) Foreign Application Priority Data

Mar. 31, 2021 (JP) ................................. 2021-059586

(51) Int. Cl.
*G02B 27/01* (2006.01)
*G02B 5/30* (2006.01)
*G02B 27/28* (2006.01)

(52) U.S. Cl.
CPC ....... *G02B 27/0172* (2013.01); *G02B 5/3083* (2013.01); *G02B 27/283* (2013.01);
(Continued)

(58) Field of Classification Search
CPC .......................... G02B 27/0172; G02B 5/3083; G02B 27/283; G02B 27/286; G02B 2027/0112; G02B 2027/0118; G02B 2027/0178
See application file for complete search history.

(56) References Cited

U.S. PATENT DOCUMENTS

2006/0098293 A1* 5/2006 Garoutte ............ G02B 27/0172
359/630
2014/0071539 A1* 3/2014 Gao ................... G02B 27/0172
359/737
(Continued)

FOREIGN PATENT DOCUMENTS

JP 2005148655 A * 6/2005
JP 2018036499 A * 3/2018
(Continued)

OTHER PUBLICATIONS

JP-2018036499-A Mar. 8, 2018 Sakaguchi K English translation (Year: 2018).*
(Continued)

*Primary Examiner* — Ricky L Mack
*Assistant Examiner* — K Muhammad
(74) *Attorney, Agent, or Firm* — Oliff PLC

(57) ABSTRACT

An optical module includes a display element that emits image light of P-polarized light, an optical member including an incident portion on which the image light emitted is incident and an emission portion that emits the image light, a first wavelength plate that is disposed on the optical path between the display element and the optical member and that makes the image light of the P-polarized light into image light of circular polarized light, a second wavelength plate that is flat, that disposed between the incident portion and the emission portion of the optical member, and that makes the image light of the circular polarized light into image light of S-polarized light and make the image light of the S-polarized light into image light of P-polarized light, and a combiner that reflects the image light emitted from the optical member.

10 Claims, 8 Drawing Sheets

(52) U.S. Cl.
CPC .... *G02B 27/286* (2013.01); *G02B 2027/0112* (2013.01); *G02B 2027/0118* (2013.01); *G02B 2027/0178* (2013.01)

(56) References Cited

U.S. PATENT DOCUMENTS

| | | |
|---|---|---|
| 2017/0255015 A1 | 9/2017 | Geng et al. |
| 2019/0171026 A1* | 6/2019 | Parsons .................... G02B 5/26 |
| 2021/0333456 A1* | 10/2021 | Ishioka ................ H10K 50/858 |

FOREIGN PATENT DOCUMENTS

| | | | |
|---|---|---|---|
| JP | 2019-510267 A | | 4/2019 |
| JP | 2019132902 A | * | 8/2019 |

OTHER PUBLICATIONS

JP-2005148655-A Jun. 9, 2005 Takekawa H English translation (Year: 2005).*

* cited by examiner

OPTICAL MODULE AND HEAD-MOUNTED DISPLAY DEVICE

The present application is based on, and claims priority from JP Application Serial Number 2021-059586, filed Mar. 31, 2021, the disclosure of which is hereby incorporated by reference herein in its entirety.

BACKGROUND

1. Technical Field

The present disclosure relates to an optical module that enables observation of a virtual image and a head-mounted display device including this optical module.

2. Related Art

A known head mounted display (HMD) includes a pancake lens assembly disposed to face an electronic display panel as an optical system of the HMD, a partially reflective film including a wavelength plate and a mirrored surface on an incident side of the lens assembly is arranged, and a polarized reflector mirror including a wavelength plate and a reflective polarization plane on a lens output side is arranged (refer to JP-T-2019-510267).

In the known head mounted display, the wavelength plate is disposed adjacent to the inner side of the reflective polarization plane, which is a curved surface, and thus needs to have a curved shape similar to the reflective polarization plane. However, it is not easy to deposit and attach a wavelength plate in a curved shape, desired accuracy cannot be achieved depending on the difficulty in producing the surface of the wavelength plate, and it is conceivable that polarization unevenness can occur in image light, resulting in luminance unevenness or color unevenness.

SUMMARY

An optical module or a head-mounted display device in an aspect of the present disclosure includes a display element that emits an image light in a first polarization direction, an optical member that includes: an incident portion on which the image light emitted from the display element is incident; and an emission portion that emits the image light in the first polarization direction, a first wavelength plate that is disposed on an optical path between the display element and the optical member and that makes the image light in the first polarization direction into the image light of circular polarized light, a second wavelength plate that is flat, that is disposed between the incident portion and the emission portion of the optical member, and that makes the image light of the circular polarized light into image light in a second polarization direction, in which the emission portion reflects the image light in the second polarization direction toward the incident portion, the incident portion reflects the image light reflected by the emission portion toward the emission portion, the second wavelength plate makes the image light in the second polarization direction reflected by the emission portion into the image light of the circular polarized light, and the second wavelength makes the image light reflected by the incident portion into the image light in the first polarization direction.

DESCRIPTION OF EXEMPLARY EMBODIMENTS

First Embodiment

Hereinafter, a head-mounted display device according to a first embodiment according to the present disclosure and an optical module incorporated therein will be described with reference to FIGS. 1, 2, and the like.

Figure 1:
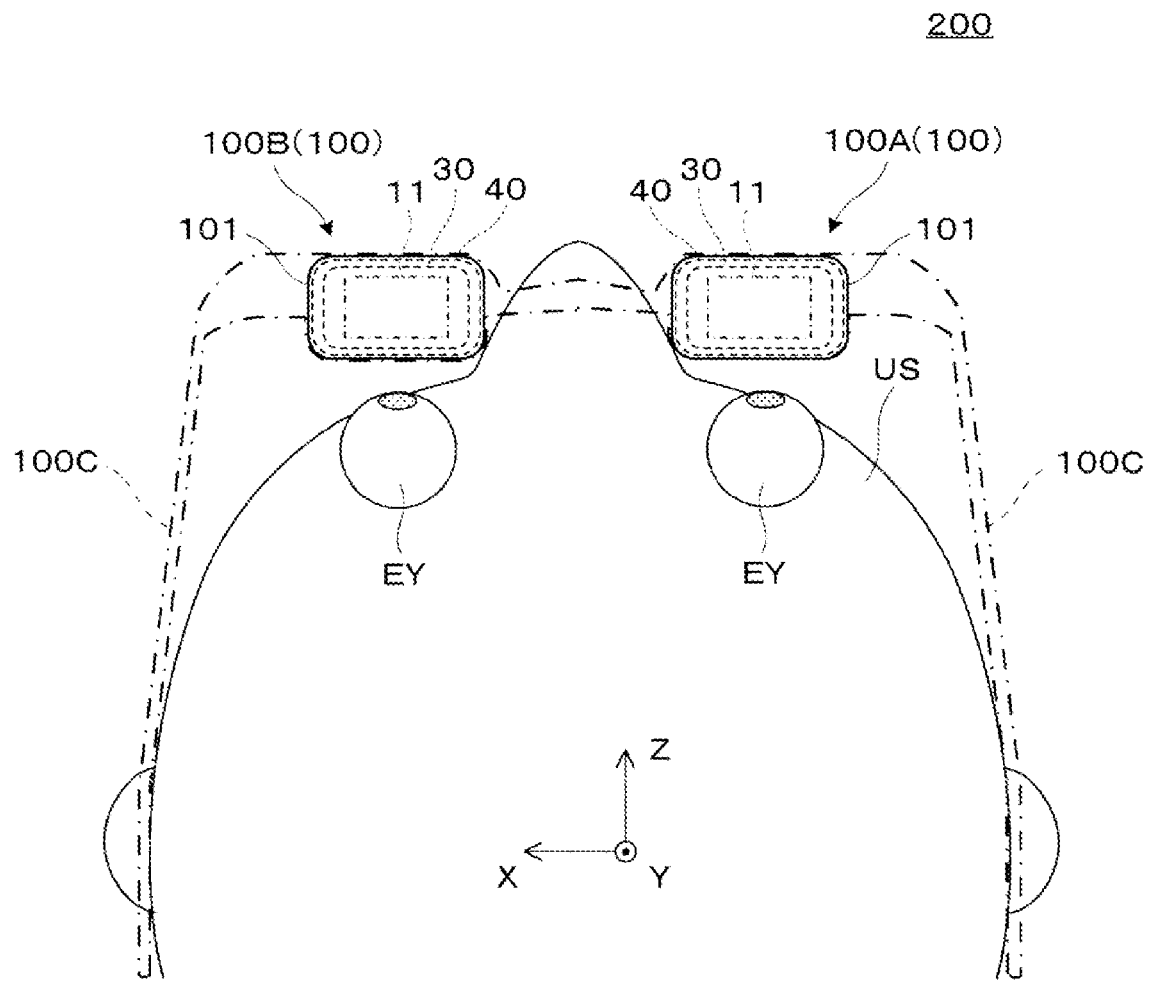
FIG. 1 is a plan view illustrating a mounted state of an HMD according to a first embodiment.

FIG. 1 is a diagram illustrating a mounted state of a head mounted display (hereinafter, also referred to as "HMD") 200, which is a head-mounted display device, and the HMD 200 allows an observer or wearer US who is wearing the HMD 200 to be able to recognize an image as a virtual image. In FIG. 1 and the like, X, Y, and Z are an orthogonal coordinate system, a +X direction corresponds to a transverse direction in which the two eyes EY of an observer or wearer US who is wearing the HMD 200 are disposed, a +Y direction corresponds to an upward direction orthogonal to the transverse direction in which the two eyes EY of the wearer US are disposed, and a +Z direction corresponds to a direction to the front or forward direction for the wearer US. A ±Y direction is parallel to a vertical axis or a vertical direction.

The HMD 200 includes a first display device 100A for the right eye, a second display device 100B for the left eye, and a pair of support devices 100C including temples and supporting the display devices 100A and 100B. The first display device 100A is disposed to cover the front side, that is, +Z side of the eyes EY of the wearer US. The first display device 100A includes an optical module 101, which is an optical system that enables observation of a virtual image. The first display device 100A and the second display device 100B are mirror-inverted, and hereinafter, the first display device 100A for the right eye will be described as a representative display device 100.

Figure 2:
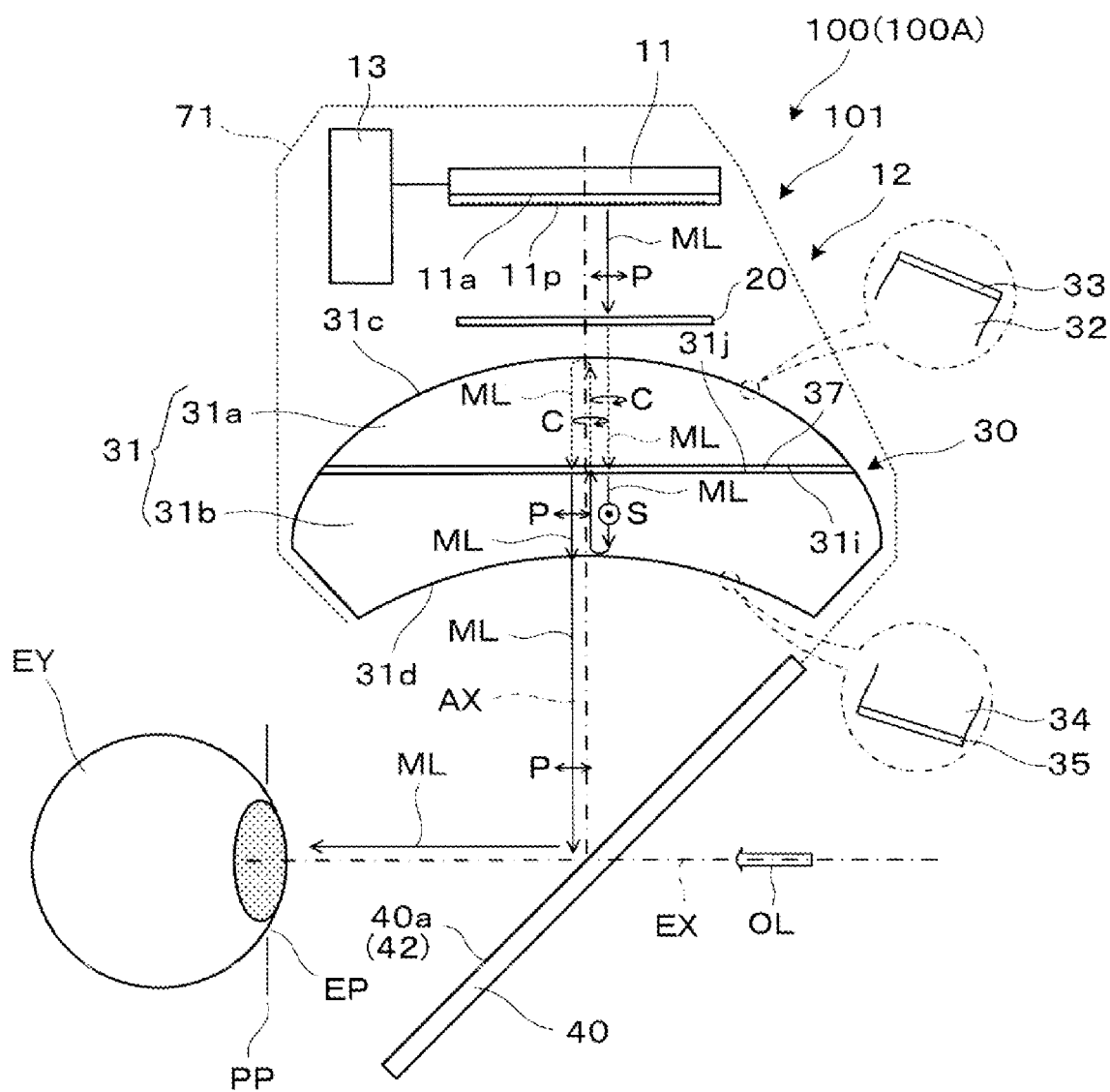
FIG. 2 is a conceptual side cross-sectional view illustrating an optical system inside the HMD.

Referring to FIG. 2, the display device 100 includes the optical module 101 and a control device 13. The optical module 101 includes a display element 11 and an imaging optical system 12. The imaging optical system 12 includes a first wavelength plate 20, an optical block 30, and a combiner 40 in the order along an optical path from the display element 11 to an exit pupil EP where an eye EY is to be located. The optical block 30 incorporates a second wavelength plate 37 in an optical member 31. The display element 11 and the first wavelength plate 20 are housed in a case 71 and are held in a positioned state. The optical block 30 is partially housed in the case 71 to expose an emission portion 31d and is held in a positioned state. The combiner 40 is fixed in a state positioned at a front lower end of the case 71.

The display element 11 is, for example, an organic electroluminescence (EL), inorganic EL, and LED-array display, and forms a color still image or moving image on a two-dimensional display surface 11a. A polarizing plate 11p is disposed to face the display surface 11a in the display element 11. Image light ML transmitted through the polarizing plate 11p is P-polarized light. In other words, the display element 11 emits P-polarized light, which is polarized light in a first polarization direction, as the image light ML. Here, the P-polarized light is based on a plane parallel to the plane of paper. In other words, the polarization direction or polarization plane of the image light ML transmitted through the polarizing plate 11p is parallel to the YZ plane. The display element 11 is not limited to a spontaneous light emission type image light generation device, and may include an LCD and another light modulation element, and may form an image by illuminating the light modulation element with a light source such as a backlight. As the display element 11, a liquid crystal on silicon (LCOS) (LCoS is a registered trademark), a digital micro-mirror device, or the like may be used instead of an LCD. When an LCD or LCOS is used as the display element 11, the polarizing plate 11p may be omitted. The aspect ratio of the display surface 11a of the display element 11 is of a rectangular type with the size in the X direction larger than the size in the Z direction, and a landscape image is formed.

Of the imaging optical system 12, the first wavelength plate 20 is disposed, on the optical path between the display element 11 and the optical member 31, perpendicularly to an optical axis AX of the image light corresponding to the center of the angle of view of the image light ML emitted from the display element 11 toward the optical block 30. The first wavelength plate 20 is a λ/4 plate, and is formed from, for example, a crystalline-based or resin-based material having birefringence. When the display element 11 forms a color image, the first wavelength plate 20 desirably achieves a phase difference or retardation corresponding to substantially λ/4 for each color of RGB. Furthermore, the first wavelength plate 20 desirably has characteristics to compensate for incident angle dependency, meaning that the phase difference imparted by the incident angle of the image light ML is offset from a target value. Here, because the first wavelength plate 20 is flat, the first wavelength plate 20 can have color compensation characteristics and angle compensation characteristics as described above with a predetermined or higher accuracy. The first wavelength plate 20 converts the image light ML emitted from the display element 11 from the P-polarized light, which is polarized light in the first polarization direction, to circular polarized light. The first wavelength plate 20 is disposed so that the fast axis thereof forms 45° with respect to the X direction and the Z direction in a plane perpendicular to the optical axis AX and parallel to the XZ plane.

The optical block 30 is formed by joining and integrating a first block 31a having a lens shape, the second wavelength plate 37, and a second block 31b having a lens shape. A combination of the first block 31a and the second block 31b is referred to as the optical member 31. The first block 31a is formed from a light transmissive material and includes an incident portion 31c and an inner emission portion 31i. The incident portion 31c is an optical surface protruding toward the display element 11 or a convex surface, and is constituted by a rotationally symmetric surface such as a spherical surface, an aspheric surface, and the like. The inner emission portion 31i is planar. The second block 31b is formed from a light transmissive material and includes an inner incident portion 31j and the emission portion 31d. The inner incident portion 31j is planar. The emission portion 31d is an optical surface protruding toward the display element 11 or a concave surface, and is constituted by a rotationally symmetric surface such as a spherical surface, an aspheric surface, or the like. The incident portion 31c of the first block 31a has a function of converging the image light ML including the internal reflection described below. The emission portion 31d of the second block 31b has a function of diverging the image light ML including the internal reflection. The entire optical member 31 can thus have a function of collimating the image light ML.

For the optical member 31, it is not necessary to make the refractive index of the first block 31a equal to the refractive index of the second block 31b, and these refractive indices can be different from each other. When the refractive index or Abbe number of the first block 31a differs from the refractive index or Abbe number of the second block 31b, the function of correcting color aberration, for example, can be provided. The incident portion 31c of the first block 31a has a first curvature, the emission portion 31d of the second block 31b has a second curvature. The first curvature of the incident portion 31c substantially equals to the second curvature of the emission portion 31d. In this case, it is easy to suppress various aberrations such as color aberrations. Note that when the incident portion 31c of the first block 31a and the emission portion 31d of the second block 31b have aspheric surfaces, it suffices if the first curvature substantially equals to the second curvature as a result of comparison with the curvature of a spherical surface that is fitted to the spherical surface.

The optical member 31 forms an optical path that is internally reflected by the incident portion 31c and the emission portion 31d. The image light ML emitted from the display element 11 and passing through the first wavelength plate 20 is incident on the incident portion 31c of the optical member 31. The incident portion 31c of the optical member 31 is provided with a light transmissive reflection layer 33. More specifically, the light transmissive reflection layer 33 functioning as a half mirror is formed at a surface of a substrate 32 of the first block 31a. The light transmissive reflection layer 33 reflects a part of the image light ML propagating in a direction from the optical block 30 toward the display element 11, which is a direction returning in the optical member 31, into a direction from the display element 11 toward the optical block 30, which is a forward direction. The emission portion 31d of the optical member 31 emits the image light ML. The emission portion 31d is provided with a polarization reflection layer 35, which is a polarizing mirror. More specifically, the polarization reflection layer 35 reflecting S-polarized light is formed at a surface of a substrate 34 of the second block 31b. The polarization reflection layer 35 reflects the image light ML propagating in the direction from the display element 11 toward the optical block 30, which is the forward direction in the optical member 31, into the direction from the optical block 30 toward the display element 11, which is the returning direction. The light transmissive reflection layer 33 and the polarization reflection layer 35 are formed by vapor deposition or the like.

Although not illustrated in the drawings, an antireflective film can be formed at the surface of the light transmissive reflection layer 33 and of the polarization reflection layer 35.

Figure 3:
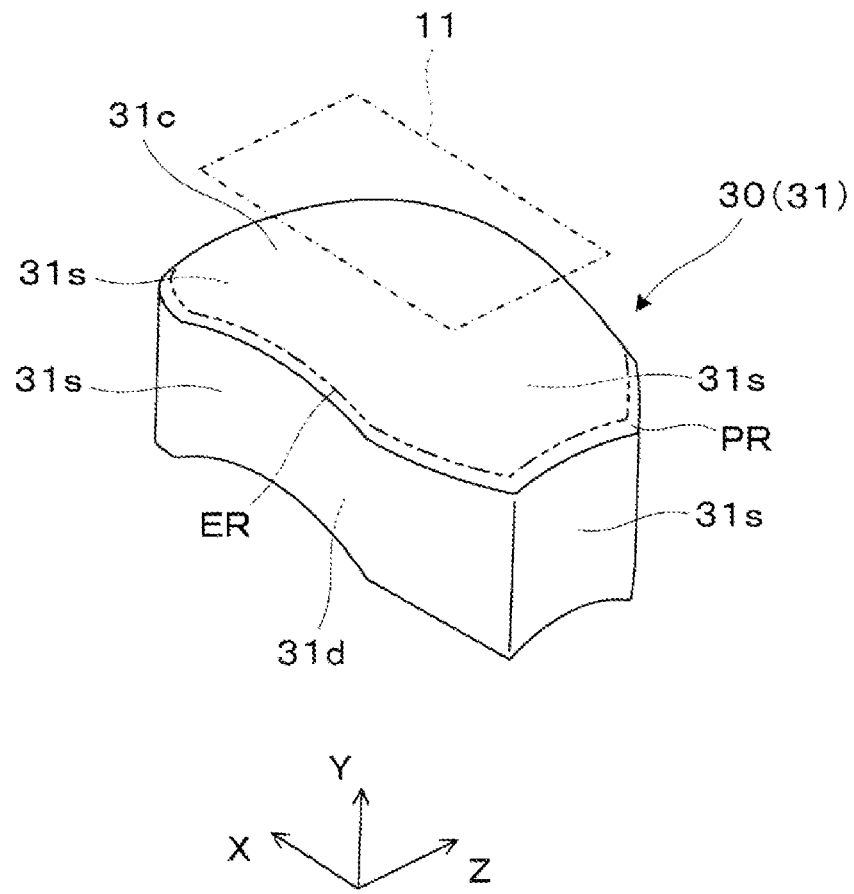
FIG. 3 is a perspective view illustrating the appearance of an optical block.

FIG. 3 is a perspective view illustrating the appearance of the optical block 30 and the optical member 31. The optical block 30 includes four side surfaces 31s as side surfaces of a cuboid, the incident portion 31c as an upper surface, and the emission portion 31d as a lower surface. The optical block 30 is sized such that an excess peripheral region PR is added to the periphery of an effective region ER of the image light ML. The optical block 30 has a longitudinal/lateral size corresponding to the aspect ratio of the display surface 11a of the display element 11. In this embodiment, the dimension between the pair of side surfaces 31s in the X direction is larger than the dimension between the pair of side surfaces 31s in the Z direction.

Returning to FIG. 2, the second wavelength plate 37 is embedded in the optical block 30 in a state of being sandwiched between the first block 31a and the second block 31b and is disposed between the incident portion 31c and the emission portion 31d of the optical member 31. The second wavelength plate 37 is disposed perpendicularly to the optical axis AX extending from the display element 11 and passing through the optical member 31. In other words, the second wavelength plate 37 is disposed parallel to the first wavelength plate 20. The second wavelength plate 37 is a λ/4 plate and is formed from, for example, a crystalline-based or resin-based material having birefringence. When the display element 11 forms a color image, the second wavelength plate 37 desirably achieves a phase difference or retardation corresponding to substantially λ/4 for each color of RGB. Furthermore, the second wavelength plate 37 desirably has characteristics to compensate for incident angle dependency. Here, because the second wavelength plate 37 is flat, the second wavelength plate 37 can have color compensation characteristics and angle compensation characteristics with a predetermined or higher accuracy, and the optical characteristics can be maintained. The second wavelength plate 37 converts the image light ML of circular polarized light propagating in the direction from the display element 11 toward the optical block 30, which is the forward direction in the optical member 31 after passing through the light transmissive reflection layer 33, into the image light ML of S-polarized light. The second wavelength plate 37 reconverts the image light ML that is S-polarized light in a second polarization direction propagating in the direction from the optical block 30 toward the display element 11 by reflection at the polarization reflection layer 35, into circular polarized light, and makes the reconverted circular polarized light into image light ML that is P-polarized light in the first polarization direction when the circular polarized light passes through the second wavelength plate 37 by reflection at the light transmissive reflection layer 33. More specifically, the second wavelength plate 37 converts the image light ML of the S-polarized light propagating in the direction from the optical block 30 toward the display element 11, which is the direction returning in the optical member 31 after being reflected by the polarization reflection layer 35, into circular polarized light, and converts the image light ML of the circular polarized light propagating in the direction from the display element 11 toward the optical block, which is the forward direction in the optical member 31 after being reflected by the light transmissive reflection layer 33, into P-polarized light. The second wavelength plate 37 is disposed so that the fast axis thereof coincides with the fast axis of the first wavelength plate 20, and specifically, the fast axis thereof forms 45° with respect to the X direction and the Z direction in the plane perpendicular to the optical axis AX and parallel to the XZ plane.

The combiner 40 is a planar mirror, and a light transmissive reflection layer 42 functioning as a half mirror is formed at an inner side surface 40a.

The following describes the optical path. The image light ML from an image formed at the display surface 11a of the display element 11 is emitted from the display element 11 in a state of being P-polarized. The image light ML emitted from the display element 11 is P-polarized light corresponding to polarized light in the first polarization direction having a polarization plane parallel to the Z direction, and the P-polarized light is converted into circular polarized light upon passing through the first wavelength plate 20. The image light ML of the circular polarized light upon passing through the first wavelength plate 20 is incident on the incident portion 31c of the optical member 31, that is, the light transmissive reflection layer 33, through which 50% of the light is transmitted, for example, and the circular polarized light is converted into S-polarized light upon passing through the second wavelength plate 37. The image light ML of the S-polarized light upon passing through the second wavelength plate 37 corresponds to polarized light in the second polarization direction having a polarization plane parallel to the X direction. The image light ML of the S-polarized light is incident on the emission portion 31d of the optical member 31, is reflected by the polarization reflection layer 35 toward the incident portion 31c, and passes again through the second wavelength plate 37, and the S-polarized light is converted into circular polarized light. The image light ML of the circular polarized light passing again through the second wavelength plate 37 is incident on the incident portion 31c, that is, the light transmissive reflection layer 33, through which 50% of the light (corresponding to 25% of the original image light ML) is reflected, for example, and the circular polarized light is converted into P-polarized light upon passing through the second wavelength plate 37. The image light ML of the P-polarized light after passing through the second wavelength plate 37 is transmitted through the polarization reflection layer 35, that is, the emission portion 31d, and is emitted from the optical member 31 toward the combiner 40. The image light ML emitted from the optical member 31 is reflected by the combiner 40 and is incident on the exit pupil EP at which the eye EY or pupil of the wearer US is located. Here, the exit pupil EP is a pupil position PP, that is, the eye point of the imaging optical system 12 at which that the eye EY is assumed to be located, where light from each point on the display surface 11a of the display element 11 is incident so as to be condensed at a point with an angle allowing observation of a virtual image. On the combiner 40, external light OL is also incident along an emission optical axis EX parallel to the optical axis AX passing through the pupil position PP. In other words, the wearer US wearing the HMD 200 can observe a virtual image made by the image light ML in a state in which it overlaps an external image.

Figure 4:
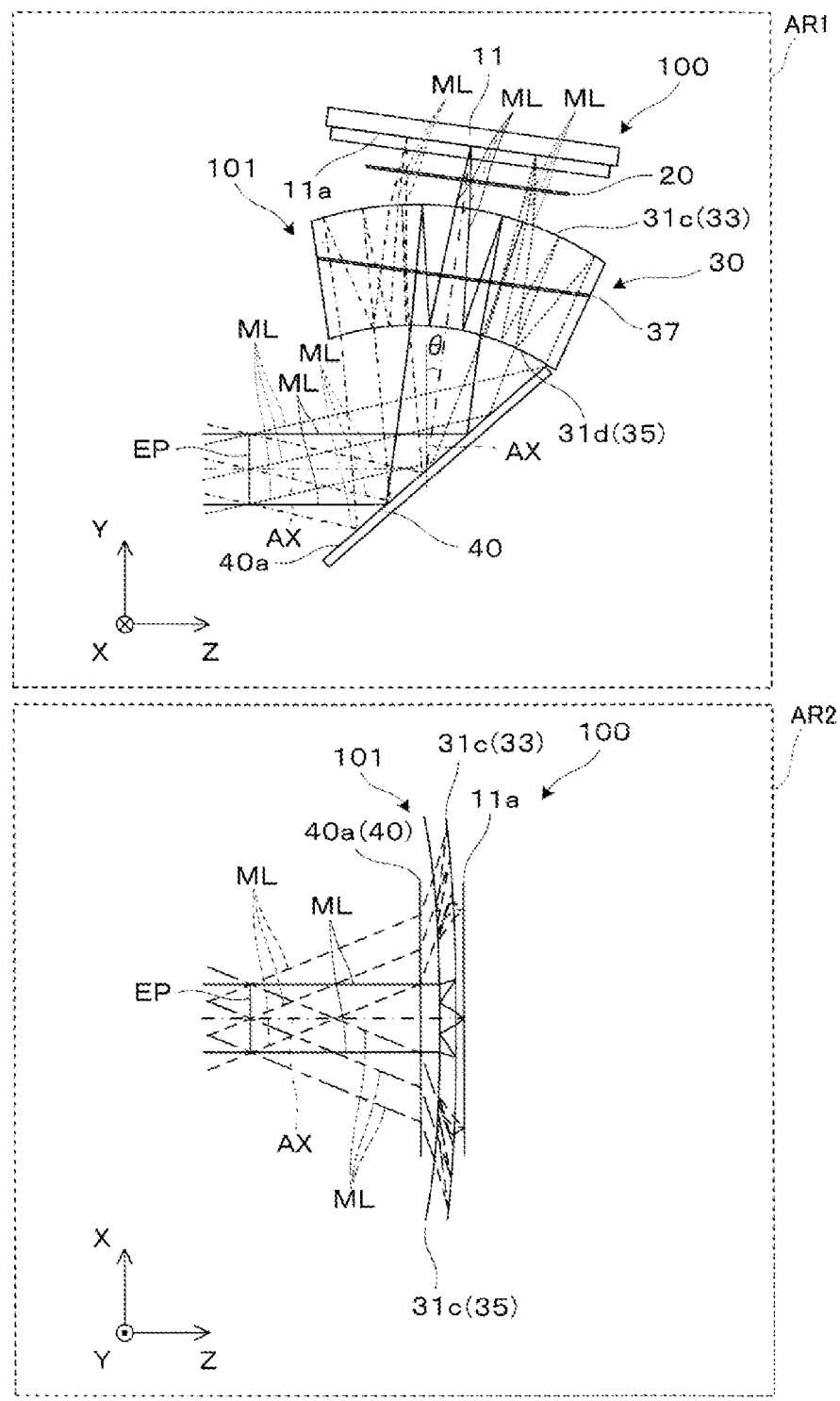
FIG. 4 includes a side view and a plan view of a specific optical system.

FIG. 4 includes diagrams illustrating a specific optical design example of the display device 100. In FIG. 4, a region AR1 is a side cross-sectional view of the optical module 101 and the like, and a region AR2 is a partially transparent plan view of the optical module 101 and the like. In this example, the optical axis AX from the display element 11 to the combiner 40 is not parallel to, but has a constant inclination with respect to the Y axis, which is a vertical axis. The combiner 40 is a flat plate. By adjusting the inclination angle of the combiner 40, the optical axis AX from the display element 11 to the combiner 40 is in a state inclined by an angle θ with respect to a vertical state parallel to the Y axis. Consequently, the combiner 40 is set to have an inclination of less than 45 degrees with respect to the Z axis. In this case as well, P-polarized light, which is polarized light in the first polarization direction, has a polarization plane parallel to the YZ plane.

As described above, the display device 100 or the optical module 101 of this embodiment includes the display element 11 configured to emit image light ML of P-polarized light, the optical member 31 including the incident portion 31c on which the image light ML emitted from the display element 11 is incident and the emission portion 31d configured to emit the image light ML, and forming an optical path internally reflected by the incident portion 31c and the emission portion 31d, the first wavelength plate 20 disposed on the optical path between the display element 11 and the optical member 31 and configured to make the image light ML of the P-polarized light into image light ML of circular polarized light, the second wavelength plate 37 that is flat, disposed between the incident portion 31c and the emission portion 31d of the optical member 31, and configured to make the image light of the circular polarized light into image light ML of S-polarized light and make the image light ML of the S-polarized light into image light ML of P-polarized light, and the combiner 40 configured to reflect the image light ML emitted from the optical member 31. In this case, the second wavelength plate 37 disposed between the incident portion 31c and the emission portion 31d of the optical member 31 is flat, the optical design is simple, and it is easy to have optical characteristics reflecting the optical design. As a result, polarization unevenness is unlikely to occur in the image light ML, and it is possible to display an image with reduced luminance unevenness or color unevenness.

Second Embodiment

Hereinafter, a head-mounted display device and the like according to a second embodiment of the present disclosure will be described. The head-mounted display device according to the second embodiment is obtained by modifying a part of the head-mounted display device according to the first embodiment, and description of common parts will be omitted.

Figure 5:
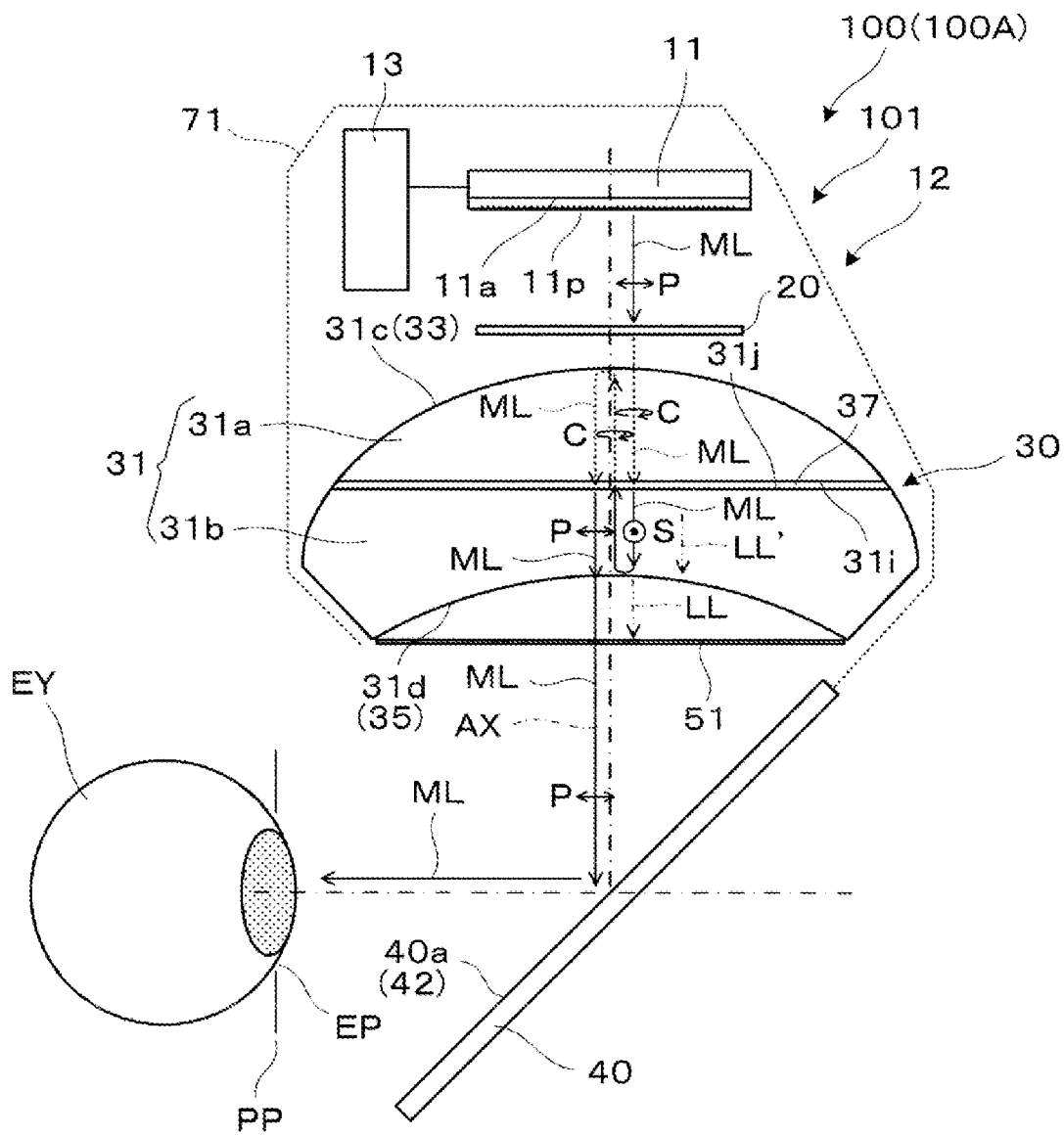
FIG. 5 is a conceptual side cross-sectional view illustrating an optical system in an HMD according to a second embodiment.

FIG. 5 is a side cross-sectional view of a display device 100 according to the second embodiment. This display device 100 includes a polarizing plate 51 between the optical block 30 and the combiner 40. The polarizing plate 51 is disposed to face the emission portion 31d of the optical member 31 and blocks the image light ML of the S-polarized light in the second polarization direction. The polarizing plate 51 prevents the S-polarized light not reflected by the polarization reflection layer 35 of the emission portion 31d from affecting the image as leakage light LL. Typically, it is difficult for the polarization reflection layer 35 to reflect 100% of the image light ML across the entire visible wavelength range and all of the different incident angles, thereby causing a certain amount of leakage light LL. It is difficult for the combiner 40 to completely attenuate such leakage light LL, making it easy to cause a ghost or the like. Even when the polarization reflection layer 35 causes the leakage light LL of the S-polarized light to pass therethrough, the polarizing plate 51 suppresses incidence of the leakage light LL on the combiner 40 and suppresses the occurrence of a ghost or the like. Note that the second wavelength plate 37 can also have a variation of substantially λ/4±λ/300, for example, due to manufacturing tolerances or the like. In this case, although image light ML in which leakage light LL' of P-polarized light is mixed is incident on the polarization reflection layer 35, the leakage light LL' of the P-polarized light has low intensity compared to the S-polarized light, which is the original image light ML, and is largely attenuated by the polarization reflection layer 35 and hardly passes therethrough, and thus can be attenuated by the polarization reflection layer 35.

The polarizing plate 51 is larger than the first wavelength plate 20 and smaller than the second wavelength plate 37 when viewed in a direction (specifically, the X direction) perpendicular to an imaginary plane (specifically, the YZ plane, for example) perpendicular to the optical axis AX extending from the display element 11 and passing through the optical member 31. When assembled, the polarizing plate 51 is positioned by a mechanism causing rotation about the optical axis AX as the center axis and is fixed to the case 71 or the optical block 30. As a result, the amount of the leakage light LL incident on the combiner 40 can be reduced, and adjustments can be made to mitigate assembly tolerances of the first wavelength plate 20 and the optical block 30.

Third Embodiment

Hereinafter, a head-mounted display device and the like according to a third embodiment of the present disclosure will be described. The head-mounted display device according to the third embodiment is obtained by modifying a part of the head-mounted display device according to the first embodiment, and description of common parts will be omitted.

Figure 6:
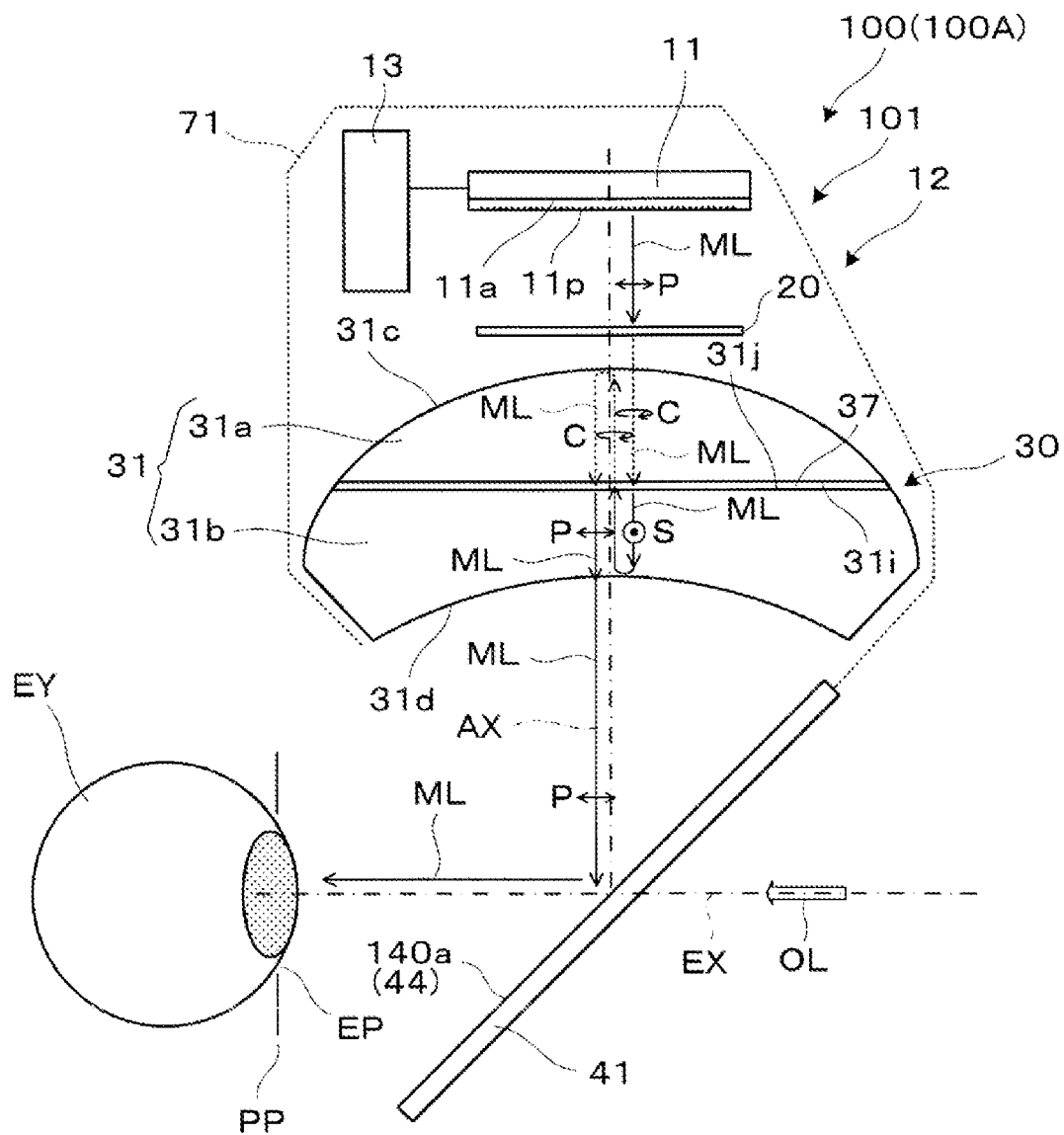
FIG. 6 is a conceptual side cross-sectional view illustrating an optical system in an HMD according to a third embodiment.

FIG. 6 is a side cross-sectional view of a display device 100 according to the third embodiment. In the display device 100, a polarization reflection layer 44 is formed at an inner side surface 140a of a combiner 41. That is, the combiner 41 includes the polarization reflection layer 44, and the polarization reflection layer 44 is disposed to face the emission portion 31d of the optical member 31. Here, the polarization reflection layer 44 is a polarization reflection layer configured to reflect P-polarized light in the first polarization direction and transmit S-polarized light in the second polarization direction, and thus reflects the image light ML, which is the P-polarized light corresponding to the first polarization direction, at a reflectance close to 100%.

The image light ML of P-polarized light is emitted from the display element 11, and the P-polarized light is converted into circular polarized light upon passing through the first wavelength plate 20. The image light ML of the circular polarized light upon passing through the first wavelength plate 20 passes through the incident portion 31c of the optical member 31, and the circular polarized light is converted into S-polarized light upon passing through the second wavelength plate 37. The image light ML of the S-polarized light is incident on the emission portion 31d of the optical member 31, is reflected by the polarization reflection layer 35 toward the incident portion 31c, and passes again through the second wavelength plate 37, and the S-polarized light is converted into circular polarized light. The image light ML of the circular polarized light passing again through the second wavelength plate 37 is reflected by the inner side of the incident portion 31c, and the circular polarized light is converted into P-polarized light upon passing through the second wavelength plate 37. The image light ML of the P-polarized light after passing through the second wavelength plate 37 is emitted from the optical member 31 to the combiner 41 via the emission portion 31d. The image light ML emitted from the optical member 31 is reflected by the polarization reflection layer 44 included in the combiner 41 and is incident on the exit pupil EP at which the eye EY or pupil of the wearer US is located.

Modified Examples and Others

The present disclosure is described according to the above-described embodiments, but the present disclosure is not limited to the above-described embodiments. The present disclosure may be carried out in various modes without departing from the gist of the present disclosure, and, for example, the following modifications may be carried out.

Although the description is omitted above, a filter can be disposed between the display element 11 and the first wavelength plate 20 for narrowing the wavelength of image light ML, such as RGB, into a narrow band. While the first wavelength plate 20 desirably causes no dispersion related to a phase difference imparted and retardation in a wide band, it is not easy to suppress such dispersion. By incorporating a filter for achieving a narrower band, it is possible to reduce effects of a phase difference imparted and retardation difference on images.

The optical module 101 is of a portrait type in which the optical axis AX is disposed parallel to the YZ plane. Alternatively, the optical module 101 may be of a landscape type in which the optical axis AX is disposed parallel to the XZ plane.

The HMD 200 is used for two eyes and includes a pair of display devices 100A and 100B. Alternatively, the HMD 200 may include only one of the display devices 100A and 100B. In this case, the single display device 100 functions as the HMD 200.

A light control device that controls light by limiting transmitted light of the combiner 40 may be attached to the external side of the combiner 40. The light control device adjusts a transmittance, for example, electrically. Mirror liquid crystals, electronic shades, and the like may be used as the light control device. The light control device may adjust a transmittance according to outside light brightness.

Figure 7:
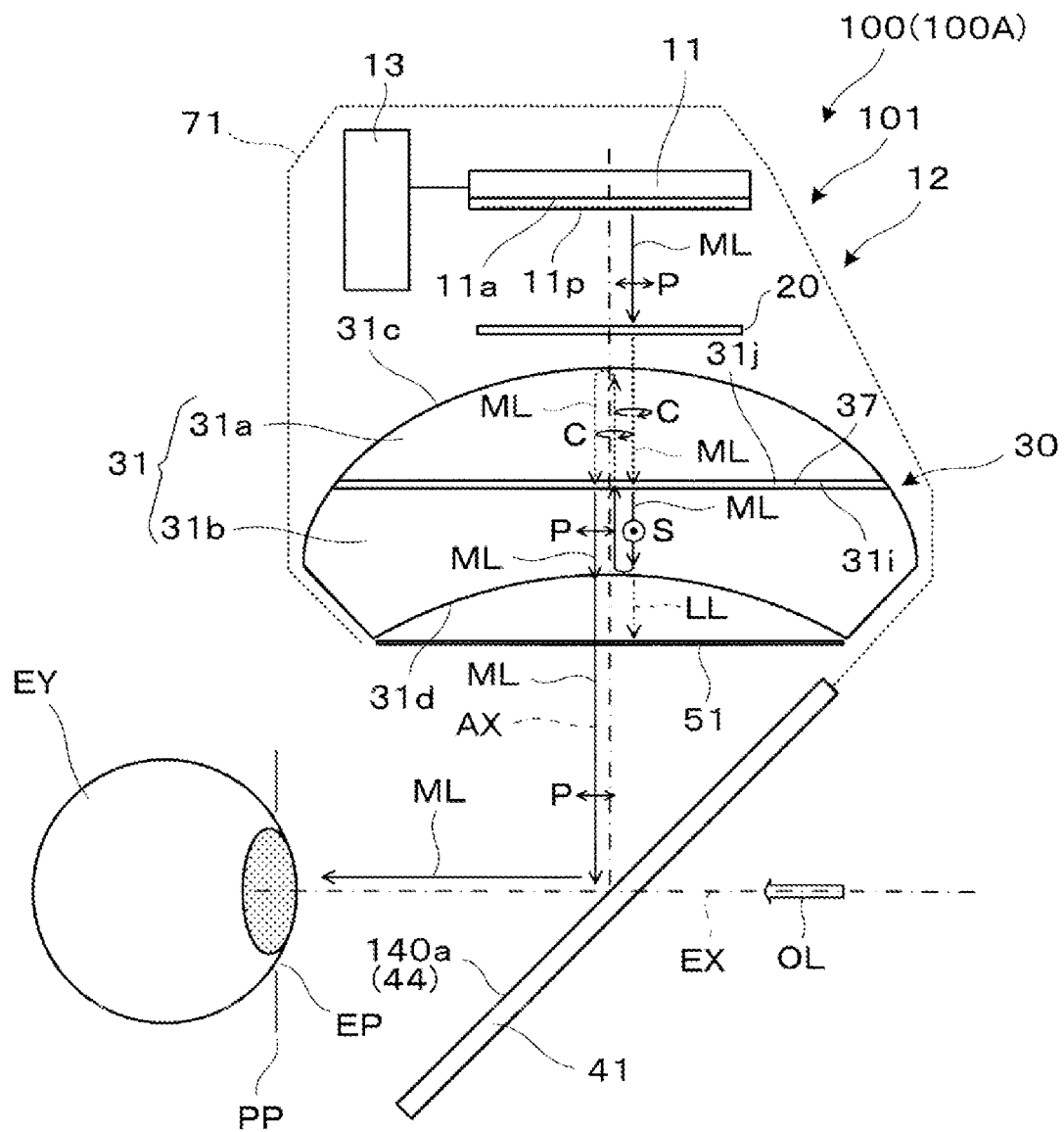
FIG. 7 is a conceptual side cross-sectional view illustrating a modified example.

As illustrated in FIG. 7, a possible configuration may include the polarizing plate 51 and the combiner 41 including the polarization reflection layer 44. In this case, the leakage light LL emitted from the optical member 31, causing ghost light, can be further attenuated. In other words, the leakage light LL emitted from the optical member 31 to the combiner 41 is attenuated upon passing through the polarizing plate 51 disposed between the optical member 31 and the combiner 41. Furthermore, the leakage light LL after passing through the polarizing plate 51 is transmitted by the polarization reflection layer 44 included in the combiner 41. Thus, the leakage light LL incident on the exit pupil EP at which the eye EY or pupil of the wearer US is located can be further attenuated.

In the embodiments illustrated in FIGS. 2, 5, 6, 7, and the like, the image light ML transmitted through the polarizing plate 11p facing the display surface 11a of the display element 11 is P-polarized light in the first polarization direction, but may be S-polarized light. In this case, the image light ML in the second polarization direction is P-polarized light.

Figure 8:
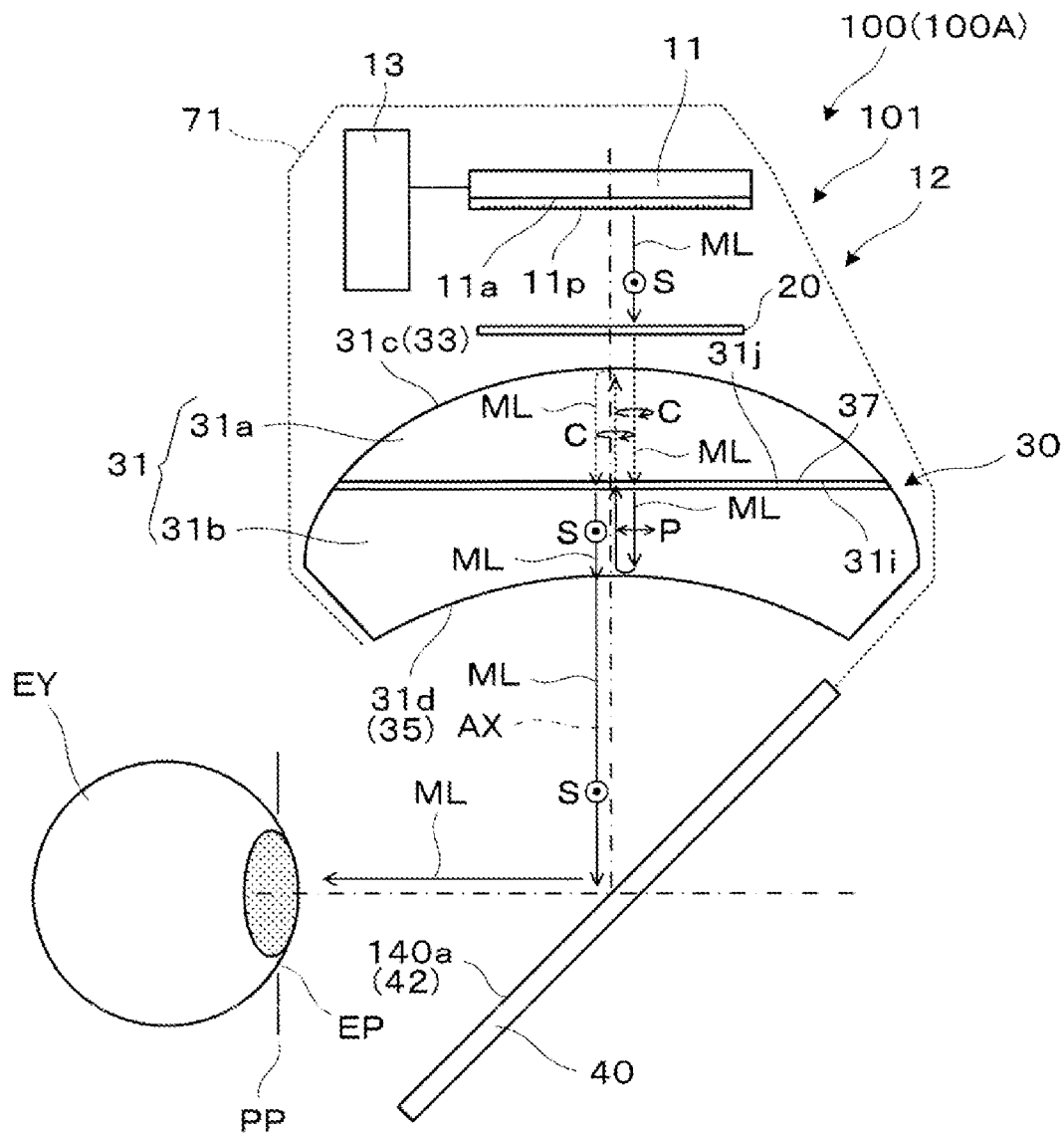
FIG. 8 is a conceptual side cross-sectional view illustrating another modified example.

For example, as illustrated in FIG. 8, when the image light ML in the first polarization direction is S-polarized light, the S-polarized light emitted from the display element 11 is converted into circular polarized light upon passing through the first wavelength plate 20. The image light ML of the circular polarized light upon passing through the first wavelength plate 20 passes through the incident portion 31c of the optical member 31, and the circular polarized light is converted into P-polarized light upon passing through the second wavelength plate 37. The image light ML of the P-polarized light is incident on the emission portion 31d of the optical member 31, is reflected by the polarization reflection layer 35 toward the incident portion 31c and goes back, and passes again through the second wavelength plate 37, and the P-polarized light is converted into circular polarized light. The image light ML of the circular polarized light passing again through the second wavelength plate 37 is reflected by the incident portion 31c, and the circular polarized light is converted into S-polarized light upon passing through the second wavelength plate 37. The image light ML of the S-polarized light after passing through the second wavelength plate 37 is emitted from the optical member 31 toward the combiner 40 via the emission portion 31d. The image light ML emitted from the emission portion 31d is reflected by the combiner 40 and is incident on the exit pupil EP at which the eye EY or pupil of the wearer US is located.

In addition, also when S-polarized light travels in the first polarization direction, as in FIG. 5, the polarizing plate 51 is disposed between the optical block 30 and the combiner 40, so that the leakage light LL causing ghost light can be reduced. In this case, the polarizing plate 51 is disposed to face the emission portion 31d of the optical member 31 and blocks the image light ML that is leakage light of the P-polarized light in the second polarization direction.

In addition, also when S-polarized light travels in the first polarization direction, as in FIG. 6, the polarization reflection layer 44 is formed at the inner side surface 140a of the combiner 41, so that the image light ML that is S-polarized light corresponding to the first polarization direction can be reflected at a reflectance close to 100%.

In this embodiment, the aspect ratio of the display surface 11a of the display element 11 is of a rectangular type with the size in the X direction larger than the size in the Z direction. Alternatively, the aspect ratio of the display surface 11a of the display element 11 can be of a rectangular type with the size in the Z direction larger than the size in the X direction. In this case, a portrait image is formed. Alternatively, the aspect ratio of the display surface 11a of the display element 11 can be of a square type with the size in the Z direction being equal to the size in the X direction.

An optical module in a specific aspect includes a display element configured to emit image light in a first polarization direction, an optical member including an incident portion on which the image light emitted from the display element is incident and an emission portion configured to emit the image light in the first polarization direction, a first wavelength plate disposed on an optical path between the display element and the optical member and configured to make the image light in the first polarization direction into the image light of circular polarized light, a second wavelength plate that is flat, disposed between the incident portion and the emission portion of the optical member, and configured to make the image light of the circular polarized light into image light in a second polarization direction, and a combiner configured to reflect the image light emitted from the optical member, in which the emission portion is configured to reflect the image light in the second polarization direction toward the incident portion, the incident portion is configured to reflect the image light reflected by the emission portion toward the emission portion, and the second wavelength plate is configured to make the image light in the second polarization direction reflected by the emission portion into the image light of the circular polarized light and make the image light reflected by the incident portion into the image light in the first polarization direction.

With the above-described optical module, the second wavelength plate disposed between the incident portion and the emission portion of the optical member is flat, the optical design is simple, and it is easy to have optical characteristics reflecting the optical design. As a result, polarization unevenness is unlikely to occur in the image light, and it is possible to display an image with reduced luminance unevenness or color unevenness.

In a specific aspect, a light transmissive reflection layer is disposed at the incident portion of the optical member, a polarization reflection layer is disposed at the emission portion of the optical member. The polarization reflection layer is configured to transmit the image light in the first polarization direction and reflect the image light in the second polarization direction toward the incident portion. In this case, this polarization reflection layer can enhance the reflection efficiency of the image light incident on this polarization reflection layer first and enhance the transmission efficiency of the image light incident on this polarization reflection layer next, and thus a bright image can be displayed.

In a specific aspect, the incident portion of the optical member includes a curved surface having a first curvature that protrudes toward the display element, and the emission portion of the optical member includes a curved surface having a second curvature that protrudes toward the display element. The incident portion has a function of converging the image light including the internal reflection. The emission portion has a function of diverging the image light including the internal reflection. The entire optical member can thus have a function of collimating the image light.

In a specific aspect, the first curvature of the incident portion substantially equals to the second curvature of the emission portion. In this case, it is easy to suppress various aberrations such as curvature of field.

In a specific aspect, the second wavelength plate extends perpendicularly to the optical axis extending from the display element and passing through the optical member. In this case, the second wavelength plate is disposed symmetrically about the optical axis, and the optical characteristics of the second wavelength plate can be made appropriate depending on its function.

In a specific aspect, the second wavelength plate is disposed parallel to the first wavelength plate. In other words, the first wavelength plate and the second wavelength plate are disposed symmetrically about the optical axis.

In a specific aspect, a polarizing plate is disposed to face the emission portion of the optical member and blocks the image light in the second polarization direction. In this case, leakage of polarized light caused by the manufacturing accuracy of the polarization reflection layer can be reduced, and ghosts can be prevented from occurring.

In a specific aspect, the polarizing plate is larger than the first wavelength plate and smaller than the second wavelength plate when viewed in a direction perpendicular to an imaginary plane perpendicular to an optical axis extending from the display element and passing through the optical member.

In a specific aspect, the combiner includes a polarization reflection layer configured to reflect the image light in the first polarization direction and transmit the image light in the second polarization direction. In this case, leakage of polarized light caused by the manufacturing accuracy of the polarization reflection layer can be reduced, and ghosts can be prevented from occurring.

In a specific aspect, a head-mounted display device includes the optical module described above, and a control device configured to cause the display element to perform display operation.

What is claimed is:

1. An optical module comprising:
    a display element that emits an image light in a first polarization direction;
    an optical block that includes:
        an incident portion on which the image light emitted from the display element is incident and that includes a light transmissive reflection layer that is a half mirror; and
        an emission portion that emits the image light in the first polarization direction and includes a polarization reflection layer;
    a combiner that reflects the image light emitted from the optical block and that is intersected by an optical axis of the image light that extends from the display element and passes through the optical block;
    a first wavelength plate that is a $\lambda/4$ plate and is disposed, in an optical path of the image light, between the display element and the optical block so that the image light emitted from the display element is directly incident on a first surface of the first wavelength plate and the image light emitted from a second surface of the first wavelength plate is directly incident on the incident portion of the optical block, the first and second surfaces being on opposite sides of the first wavelength plate from each other along the optical path, and the first wavelength plate converting the image light in the first polarization direction into circular polarized light; and
    a second wavelength plate that (i) is a $\lambda/4$ plate, (ii) is flat, (iii) is embedded in the optical block so as to be disposed between the incident portion and the emission portion in the optical path, and (iv) converts the circular polarized light incident on the incident portion into image light in a second polarization direction, wherein
    the polarization reflection layer of the emission portion is configured to reflect the image light in the second polarization direction toward the incident portion,
    the second wavelength plate is configured to convert the image light in the second polarization direction, which has been reflected back toward the display element by the emission portion, into circular polarized light,
    the light transmissive reflection layer of the incident portion is configured to reflect toward the emission portion the circular polarized light, which has been reflected by the emission portion and converted by the second wavelength plate, and
    the second wavelength plate is configured to convert the image light reflected forward and away from the display element by the incident portion into the image light in the first polarization direction.
2. The optical module according to claim 1, wherein the polarization reflection layer transmits the image light in the first polarization direction.
3. The optical module according to claim 2, wherein the incident portion of the optical block has a first curvature that protrudes toward the display element, and the emission portion of the optical block has a second curvature that protrudes toward the display element.

4. The optical module according to claim 2, wherein
the incident portion of the optical block has a first curvature that protrudes toward the display element, and
the emission portion of the optical block has the first curvature that protrudes toward the display element.

5. The optical module according to claim 1, wherein the second wavelength plate is disposed perpendicularly to the optical axis of the image light passing through the optical block from the display element.

6. The optical module according to claim 5, wherein the second wavelength plate is disposed parallel to the first wavelength plate.

7. The optical module according to claim 1, comprising a polarizing plate that is disposed, in the optical path, between the emission portion of the optical block and the combiner, wherein
the polarizing plate blocks the image light in the second polarization direction.

8. The optical module according to claim 7, wherein the polarizing plate is larger than the first wavelength plate and smaller than the second wavelength plate when viewed along the optical axis extending from the display element and passing through the optical block.

9. The optical module according to claim 7, wherein the combiner includes a polarization reflection layer that reflects the image light in the first polarization direction and that transmits the image light in the second polarization direction.

10. A head-mounted display device comprising:
the optical module described in claim 1; and
a control device configured to cause the display element to perform display operation.

* * * * *